United States Patent
Tai et al.

(10) Patent No.: US 8,836,299 B2
(45) Date of Patent: Sep. 16, 2014

(54) VOLTAGE CONVERTER

(75) Inventors: Fang-Ta Tai, New Taipei (TW); Jen-Fan Sun, New Taipei (TW); Chen-Hsiang Lin, New Taipei (TW); Cheng-I Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 418 days.

(21) Appl. No.: 13/227,615

(22) Filed: Sep. 8, 2011

(65) Prior Publication Data

US 2012/0313435 A1    Dec. 13, 2012

(30) Foreign Application Priority Data

Jun. 9, 2011    (TW) ............... 100120232 A

(51) Int. Cl.
*G05F 1/00*    (2006.01)
*G05F 3/16*    (2006.01)
*H02M 3/158*    (2006.01)
*H02M 1/00*    (2006.01)

(52) U.S. Cl.
CPC .... *H02M 3/1588* (2013.01); *H02M 2001/0006* (2013.01); *Y02B 70/1466* (2013.01)
USPC ............... 323/271; 323/222; 323/225

(58) Field of Classification Search
CPC ......... G05F 1/461; G05F 1/565; H02M 3/158
USPC .................. 323/222, 225, 268, 271, 282, 285
See application file for complete search history.

(56) References Cited

U.S. PATENT DOCUMENTS

| | | | |
|---|---|---|---|
| 7,612,545 B2 * | 11/2009 | Umemoto et al. | 323/271 |
| 8,330,437 B1 * | 12/2012 | Hartman | 323/271 |
| 8,373,395 B2 * | 2/2013 | Yashiki | 323/222 |
| 2007/0063681 A1 * | 3/2007 | Liu | 323/282 |

* cited by examiner

*Primary Examiner* — Matthew Nguyen
(74) *Attorney, Agent, or Firm* — Novak Druce Connolly Bove + Quigg LLP

(57) ABSTRACT

A voltage converter includes a driver, a subsidiary voltage converter, an inductor, a capacitor, and a voltage detection unit. The subsidiary voltage converter generates a driving voltage transmitted to the driver to supply working power to the driver. The driver controls the capacitor to be alternately charged and discharged through the inductor, thereby generating an output voltage and output current between the inductor and the first capacitor. The voltage detection unit detects an electric potential difference of the inductor and generates a reference voltage according to the electric potential difference, and the subsidiary voltage converter receives the reference voltage and adjusts the driving voltage according to the reference voltage.

10 Claims, 2 Drawing Sheets

VOLTAGE CONVERTER

BACKGROUND

1. Technical Field

The present disclosure relates to voltage converters, and particularly to a voltage converter that is capable of conserving power.

2. Description of Related Art

Direct current to direct current (DC-to-DC) voltage converters are widely used. Referring to FIG. 2, a typical DC-to-DC voltage converter 10 generally includes a driver 11, a pulse width modulation (PWM) signal generator 12, a power supply 13, a first metal oxide semiconductor field effect transistor (MOSFET) Q11, a second MOSFET Q12, an inductor L11, and a capacitor C11. Both the PWM signal generator 12 and the power supply 13 are electrically connected to the driver 11. Both a gate of the first MOSFET Q11 and a gate of the second MOSFET Q12 are electrically connected to the driver 11. A source of the first MOSFET Q11 is electrically connected to a drain of the second MOSFET Q12, and a source of the second MOSFET Q12 is grounded. The inductor L11 is electrically connected between the source of the first MOSFET Q11 and the capacitor C11. The capacitor C11 is connected between the inductor L11 and ground.

When the voltage converter 10 is used, the power supply 13 provides a driving voltage V1 to the driver 11 to supply working power to the driver 11. A charging voltage V2 is applied to a drain of the first MOSFET Q11. The PWM signal generator 12 generates PWM signals and transmits the PWM signals to the driver 11. The driver 11 generates control signals in response to reception of the PWM signals and transmits the control signals to the gates of the first MOSFET Q11 and the second MOSFET Q12. The control signals control the first MOSFET Q11 and the second MOSFET Q12 to be alternately turned on and off. When the first MOSFET Q11 is turned on and the second MOSFET Q12 is turned off, the capacitor C11 is charged by the charging voltage V2. When the first MOSFET Q11 is turned off and the second MOSFET Q12 is turned on, the capacitor C11 is discharged through the inductor L11 and the second MOSFET Q12. In this way, an output voltage V3 is generated between the inductor L11 and the capacitor C11 and is used to supply working power to loads (not shown) of the voltage converter 10. Relative parameters of the output voltage V3, such as peak voltage value, pulse width, and period, can be regulated by means of changing pulse widths and periods of the pulse signals, inductance of the inductor L11, and capacitance of the capacitor C11.

However, in the voltage converter 10, the driving voltage V1 provided by the power supply 13 is generally invariable. When working current required by the loads of the voltage converter 10 decreases, the driving voltage V1 is unable to correspondingly decrease. Thus, power of the power supply 13 may be wasted, and the driving voltage V1 may become excessively high and damage the driver 11.

Therefore, there is room for improvement within the art.

BRIEF DESCRIPTION OF THE DRAWINGS

Many aspects of the present disclosure can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the figures.

DETAILED DESCRIPTION

Figure 1:
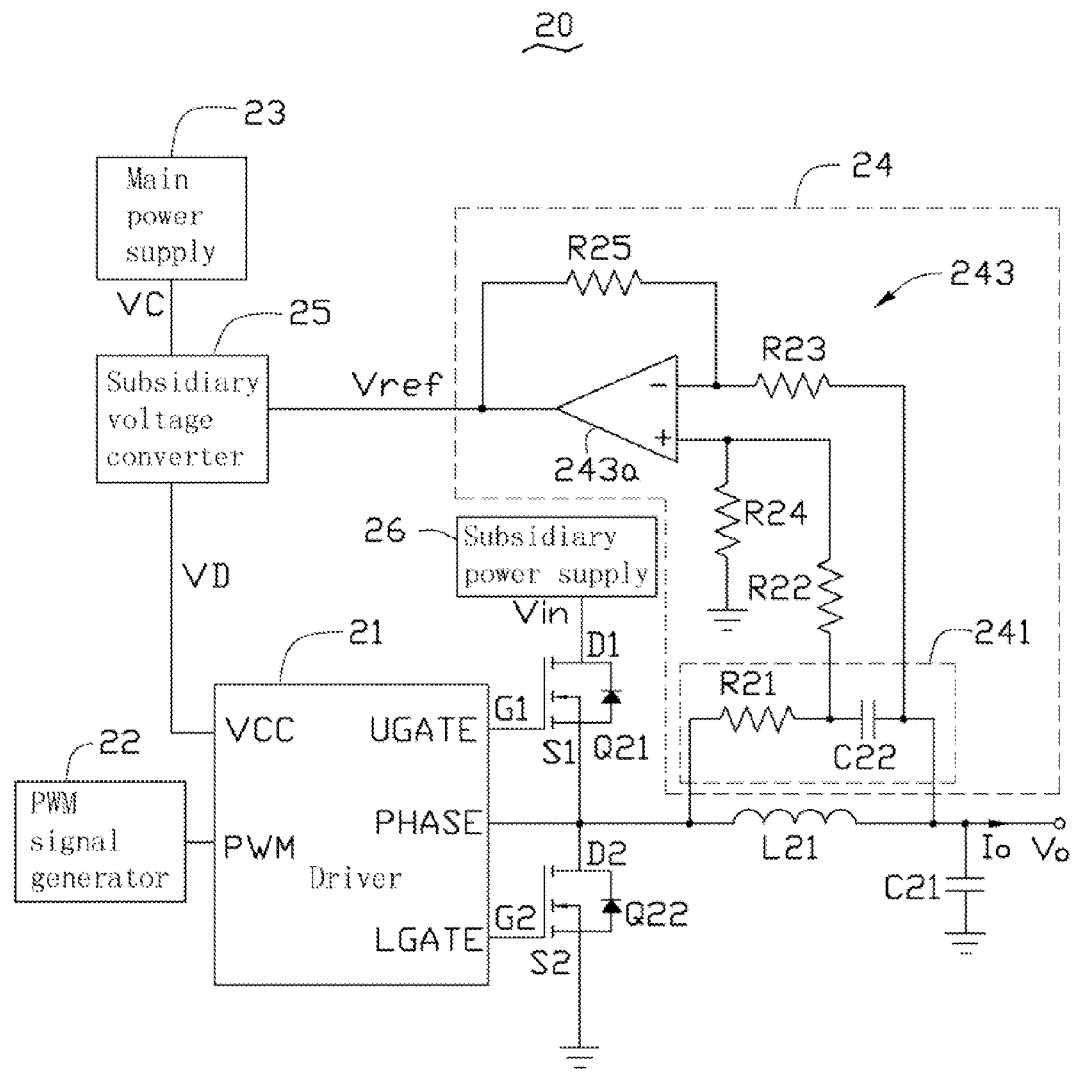
FIG. 1 is a circuit diagram of a voltage converter, according to an exemplary embodiment.
Figure 2:
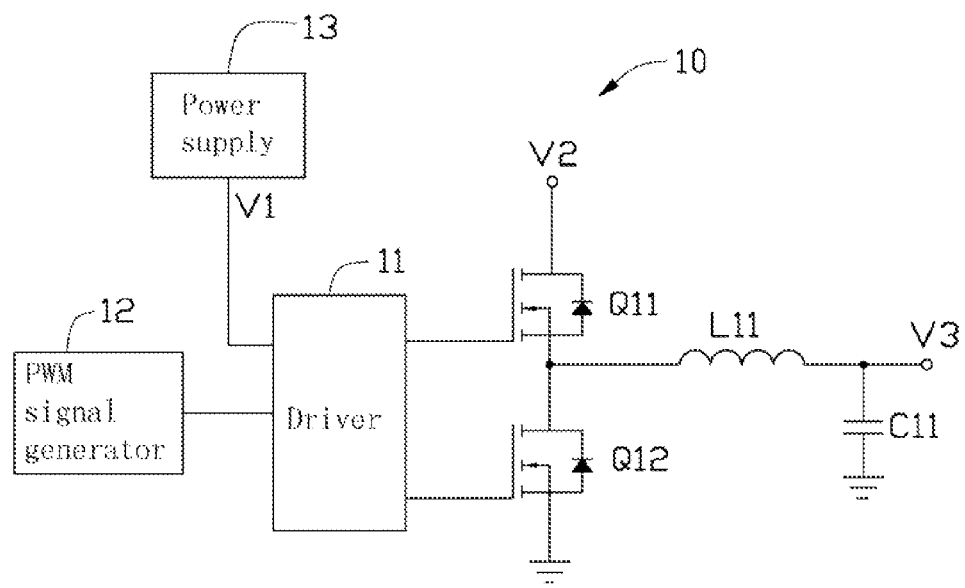
FIG. 2 is a circuit diagram of a known voltage converter.

FIG. 1 is a circuit diagram of a voltage converter 100, according to an exemplary embodiment. The voltage converter 100 is a direct current to direct current (DC-to-DC) voltage converter. In this embodiment, the voltage converter 100 includes a driver 21, a pulse width modulation (PWM) signal generator 22, a main power supply 23, a voltage detection unit 24, a subsidiary voltage converter 25, an subsidiary power supply 26, a first metal oxide semiconductor field effect transistor (MOSFET) Q21, a second MOSFET Q22, an inductor L21, and a first capacitor C21.

The driver 21 has a power supply pin VCC, a PWM signal pin PWM, a first output pin UGATE, a second output pin LGATE, and a phase pin PHASE. The PWM signal generator 22 is electrically connected to the PWM signal pin PWM. The main power supply 23 is electrically connected to the power supply pin VCC through the subsidiary voltage converter 25. The subsidiary voltage converter 25 is a voltage-controlled voltage converter, which can regulate its output voltage according to a received reference voltage.

The first MOSFET Q21 has a gate G1, a source S1, and a drain D1. The second MOSFET Q22 has a gate G2, a source S2, and a drain D2. The first output pin UGATE and the second output pin LGATE are respectively electrically connected to the gate G1 of the first MOSFET Q21 and the gate G2 of the second MOSFET Q22. The subsidiary power supply 26 is electrically connected to the drain D1 of the first MOSFET Q21. The source S1 of the first MOSFET Q21 is electrically connected to the drain D2 of the second MOSFET Q21. The source S2 of the second MOSFET Q21 is grounded. The phase pin PHASE is electrically connected between the source S1 of the first MOSFET Q21 and the drain D2 of the second MOSFET Q22.

One end of the inductor L21 is electrically connected to the phase pin PHASE, and is also electrically connected between the source S1 of the first MOSFET Q21 and the drain D2 of the second MOSFET Q22. The other end of the inductor L21 is electrically connected to the first capacitor C21. The first capacitor C21 is electrically connected between the inductor L21 and ground.

The voltage detection unit 24 includes a voltage detection circuit 241 and an operational amplifier circuit 243. The voltage detection circuit 241 includes a first resistor R21 and a second capacitor C22. The first resistor R21 is electrically connected between the second capacitor C22 and the end of the inductor L21 that is electrically connected between the source S1 of the first MOSFET Q21 and the drain D2 of the second MOSFET Q22. The second capacitor C22 is electrically connected between the first resistor R21 and the end of the inductor L21 that is electrically connected to the first capacitor C21.

The operational amplifier circuit 243 includes an operation amplifier 243a, a second resistor R22, a third resistor R23, a fourth resistor R24, and a fifth resistor R25. The operational amplifier 243a has a positive input end, a negative input end, and an output end (not labeled). One end of the second resistor R22 is electrically connected to the positive input end, and the other end of the second resistor R22 is electrically connected between the first resistor R21 and the second capacitor C22. One end of the third resistor R23 is electrically connected to the positive input end, and the other end of the third resistor R23 is electrically connected between the second capacitor C22 and the end of the inductor L21 that is electrically connected to the first capacitor C21. That is, one end of the second capacitor C22 is electrically connected to the positive input end through the second resistor R22, and the other end of the second capacitor C22 is electrically connected to the negative input end through the third resistor R23. Furthermore, the positive input end is electrically connected to ground through the fourth resistor R24. The negative input end is electrically connected to the output end through the fifth resistor R25. The output end is electrically connected to the subsidiary voltage converter 25.

When the voltage converter 20 is used, the main power supply 23 provides an invariable power supply voltage VC to the subsidiary voltage converter 25. The power supply voltage VC can be an invariable DC voltage. The subsidiary voltage converter 25 transforms the power supply voltage VC into a driving voltage VD with a predetermined value, and transmits the driving voltage VD to the driver 21 to supply working power to the driver 21. The subsidiary power supply 26 provides a charging voltage Vin applied to the drain D1 of the first MOSFET Q21. The PWM signal generator 22 generates PWM signals and transmits the PWM signals to the driver 21. The driver 21 generates control signals in response to reception of the PWM signals and transmits the control signals to the gate G1 of the first MOSFET Q21 and the gate G2 of the second MOSFET Q22. The control signals control the first MOSFET Q21 and the second MOSFET Q22 to be alternately turned on and off. When the first MOSFET Q21 is turned on and the second MOSFET Q22 is turned off, the first capacitor C21 is charged by the charging voltage Vin. When the first MOSFET Q21 is turned off and the second MOSFET Q22 is turned on, the first capacitor C21 is discharged through the inductor L21 and the second MOSFET Q22. In this way, an output voltage Vo and output current Io are generated between the inductor L21 and the first capacitor C21. The output voltage Vo and the output current Io are used to supply working power to loads (not shown) of the voltage converter 20. The driver 21 can also adjust phases of the output voltage Vo and the output current Io through the phase pin PHASE.

Relative parameters of the output voltage Vo and the output current Io, such as peak voltage and current values, pulse widths, and periods, can be regulated by means of changing pulse widths and periods of the control signals, inductance of the inductor L21, and capacitance of the capacitor C21. Furthermore, in the aforementioned using process of the voltage converter 20, the voltage detection unit 24 can detect current passing through the inductor L21 (i.e., equivalent of the output current Io), and correspondingly generate a reference voltage Vref at the output end of the operational amplifier 243a. The reference voltage Vref is received by the subsidiary voltage converter 25. When the output current Io changes, the reference voltage Vref correspondingly changes, and the subsidiary voltage converter 25 detects the change of the reference voltage Vref and regulates the driving voltage VD accordingly.

In particular, the reference voltage Vref is generated according to an electric potential difference between the positive input end and the negative input end of the operational amplifier 243a, and the electric potential difference between the positive input end and the negative input end of the operational amplifier 243a substantially equals an electric potential difference between the two ends of the second capacitor C22. According to inherent characteristics of RLC circuits, the electric potential difference between the two ends of the second capacitor C22 depends on an electric potential difference between the two ends of the inductor L21, an inductance of the inductor L21, a capacitance of the second capacitor C22, and a resistance of the first resistor R21. When these parameters are adjusted, time constants of the voltage detection circuit 241 and the first resistor R21 can be correspondingly adjusted. Thus, the electric potential difference between the two ends of the second capacitor C22 can be adjusted to change by changing of the electric potential difference between the two ends of the inductor L21.

According to the aforementioned method, in this embodiment, the capacitance of the second capacitor C22 and the resistor of the first resistor R21 are adjusted to ensure that the electric potential difference between the two ends of the second capacitor C22 and the electric potential difference between the two ends of the inductor L21 change synchronously. That is, the electric potential difference between the two ends of the second capacitor C22 substantially equals the electric potential difference between the two ends of the inductor L21.

In use, if working current required by the loads of the voltage converter 20 decreases (i.e., the output current Io decreases), the electric potential difference between the two ends of the inductor L21 decreases. For the reasons detailed above, the electric potential difference between the two ends of the second capacitor C22, the electric potential difference between the positive input end and the negative input end of the operational amplifier 243a, and the reference voltage Vref correspondingly decrease. Upon detecting the decrease of the reference voltage Vref, the subsidiary voltage converter 25 decreases the driving voltage VD. In this way, power of the main power supply 23 can be conserved, and the driving voltage VD can be prevented from becoming excessively high and damaging the driver 21. Compared with typical voltage converters (e.g., the aforementioned voltage converter 10), the voltage converter 20 can conserve power and be used more safely.

Similarly, if working current required by the loads of the voltage converter 20 increases (i.e., the output current Io increases), the reference voltage Vref can also correspondingly increase. Upon detecting the increase of the reference voltage Vref, the subsidiary voltage converter 25 increases the driving voltage VD to supply adequate power to the driver 21. Furthermore, according to inherent characteristics of operational amplifiers, an amplifying multiple of the operational amplifier 243a can be adjusted by means of adjusting resistances of the second resistor R22, the third resistor R23, the fourth resistor R24, and the fifth resistor R25. In this embodiment, the amplifying multiple of the operational amplifier 243a is adjusted according to a sensitivity of the subsidiary voltage converter 25, such that the subsidiary voltage converter 25 can quickly detect change to the reference voltage Vref and adjust the driving voltage VD accordingly.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:
1. A voltage converter, comprising:
a driver;
a subsidiary voltage converter electrically connected to the driver;
an inductor electrically connected to the driver;
a first capacitor electrically connected to the inductor; and a voltage detection unit electrically connected to the inductor and the subsidiary voltage converter; the voltage detection unit comprising an operational amplifier, the operational amplifier comprising a positive input end, a negative input end, and an output end; the positive input end and the negative input end respectively electrically connected to two ends of the inductor, and the output end electrically connected to the subsidiary voltage converter;

wherein the subsidiary voltage converter generates a driving voltage transmitted to the driver to supply working power to the driver; the driver controls the first capacitor to be alternately charged and discharged through the inductor, thereby generating an output voltage and output current between the inductor and the first capacitor; the voltage detection unit detects an electric potential difference of the inductor through the positive input end and the negative input end and generates a reference voltage on the output end according to the electric potential difference; and the subsidiary voltage converter receives the reference voltage and adjusts the driving voltage according to the reference voltage.

2. The voltage converter as claimed in claim 1, further comprising a main power supply electrically connected to the subsidiary voltage converter and providing an invariable power supply voltage to the subsidiary voltage converter, the subsidiary voltage converter transforming the power supply voltage into the driving voltage.

3. The voltage converter as claimed in claim 1, further comprising a subsidiary power supply, a first metal oxide semiconductor field effect transistor (MOSFET), and a second MOSFET; each of the first MOSFET and the second MOSFET including a gate, a source, and a drain; both the gate of the first MOSFET and the gate of the second electrically connected to the driver; the drain of the first MOSFET electrically connected to the subsidiary power supply, the source of the first MOSFET electrically connected to the drain of the second MOSFET, and the source of the second MOSFET grounded; one end of the inductor electrically connected between the source of the first MOSFET and the drain of the second MOSFET, and the other end of the inductor electrically connected to the first capacitor; and the first capacitor electrically connected between the inductor and ground.

4. The voltage converter as claimed in claim 3, wherein the subsidiary power supply provides a charging voltage to the drain of the first MOSFET, and the driver generates control signals transmitted to the gate of the first MOSFET and the gate of the second MOSFET to alternately turn on and turn off the first MOSFET and the second MOSFET; the first capacitor charged by the charging voltage when the first MOSFET is turned on and the second MOSFET is turned off, and discharged through the inductor and the second MOSFET, thereby generating the output voltage and the output current between the inductor and the first capacitor.

5. The voltage converter as claimed in claim 4, wherein the driver is electrically connected to the end of the inductor that is electrically connected between the source of the first MOSFET and the drain of the second MOSFET to adjust phases of the output voltage and the output current.

6. The voltage converter as claimed in claim 4, further comprising a pulse width modulator (PWM) signal generator electrically connected to the driver and generating PWM signals transmitted to the driver, the driver generating the control signals in response to reception of the PWM signals.

7. The voltage converter as claimed in claim 1, wherein the voltage detection unit further includes a second capacitor and a first resistor, the first resistor electrically connected between the second capacitor and the end of the inductor that is electrically connected between the source of the first MOSFET and the drain of the second MOSFET, and the second capacitor electrically connected between the first resistor and the end of the inductor that is electrically connected to the first capacitor; two end of the second capacitor respectively electrically connected to the positive input end and the negative input end of the operational amplifier.

8. The voltage converter as claimed in claim 7, wherein a capacitance of the second capacitor and a resistor of the first resistor are adjusted to ensure that an electric potential difference of the second capacitor and the electric potential difference of the inductor change synchronously, and the operational amplifier detects the electric potential difference of the inductor by detecting the electric potential difference of the second capacitor.

9. The voltage converter as claimed in claim 8, wherein the capacitance of the second capacitor and the resistor of the first resistor are adjusted to ensure that the electric potential difference of the second capacitor substantially equals the electric potential difference of the inductor.

10. The voltage converter as claimed in claim 7, wherein the voltage detection unit further includes a second resistor, a third resistor, a fourth resistor, and a fifth resistor; one of the two ends of the second capacitor electrically connected to the positive input end through the second resistor, the other of the two ends of the second capacitor electrically connected to the negative input end through the third resistor, the positive input end electrically connected to ground through the fourth resistor, and the negative input end electrically connected to the output end through the fifth resistor; an amplifying multiple of the operational amplifier adjusted by adjusting resistances of the second resistor, the third resistor, the fourth resistor, and the fifth resistor.

* * * * *